United States Patent
Hase et al.

(10) Patent No.: US 8,247,339 B2
(45) Date of Patent: Aug. 21, 2012

(54) CERAMIC CATALYST BODY

(75) Inventors: Tomomi Hase, Kariya (JP); Yoshiharu Miyake, Aichi-ken (JP)

(73) Assignee: Denso Corporation, Kariya (JP)

( * ) Notice: Subject to any disclaimer, the term of this patent is extended or adjusted under 35 U.S.C. 154(b) by 336 days.

(21) Appl. No.: 11/898,362

(22) Filed: Sep. 11, 2007

(65) Prior Publication Data

US 2008/0070775 A1    Mar. 20, 2008

(30) Foreign Application Priority Data

Sep. 11, 2006   (JP) ................. 2006-245698

(51) Int. Cl.
  *B01J 21/00*   (2006.01)
  *B01J 29/00*   (2006.01)
(52) U.S. Cl. .......................................... 502/74
(58) Field of Classification Search .................. None
  See application file for complete search history.

(56) References Cited

U.S. PATENT DOCUMENTS

| | | | |
|---|---|---|---|
| 4,849,275 A * | 7/1989 | Hamaguchi et al. | 428/116 |
| 4,869,944 A | 9/1989 | Harada et al. | |
| 5,846,899 A | 12/1998 | Kumazawa et al. | |
| 5,849,391 A * | 12/1998 | Miura et al. | 428/116 |
| 6,080,356 A | 6/2000 | Miura et al. | |
| 6,649,563 B2 | 11/2003 | Nakanishi et al. | |

FOREIGN PATENT DOCUMENTS

| | | |
|---|---|---|
| JP | S-S63-197550 | 8/1988 |
| JP | 64-4249 | 1/1989 |
| JP | 6-165939 | 6/1994 |
| JP | A-H08-112528 | 5/1996 |
| JP | 9-262484 | 10/1997 |
| JP | 2000-296340 | 10/2000 |
| JP | 2002-059009 | 2/2002 |
| JP | 2002-191985 | 7/2002 |
| JP | 2003-205246 | 7/2003 |

OTHER PUBLICATIONS

F.A.L. Dullien, Porous Media: Fluid Transport and Pore Structure, 2nd edition, p. 7, HBJ, San Diego, Feb. 1992.*
"Handbook of Ceramic Engineering", Ceramic Society of Japan, Apr. 1, 1989, p. 2094-2097, ISBN: 4-7655-0019-5 (with English Translation).
Official Action issued in corresponding JP Patent Application No. 2006-245698, dated Aug. 2, 2011 (with English Translation).

* cited by examiner

*Primary Examiner* — Emily Le
*Assistant Examiner* — Michael Forrest
(74) *Attorney, Agent, or Firm* — Nixon & Vanderhye P.C.

(57) ABSTRACT

A ceramic catalyst body has a ceramic carrier supporting catalyst therein. The ceramic carrier has plural cells surrounded by plural cell walls arranged in a honeycomb shape, and a catalyst separation ratio H of the ceramic carrier expressed by the following formula is not more than 35%. $H=217.254+(-0.167) \times T+0.345 \times D+28.731 \times \Delta CTE-3.343 \times S$, where $\Delta CTE(\times 10^{-6}/°C.)$ is a difference between a thermal expansion coefficient C1 of the ceramic catalyst body and a thermal expansion coefficient C2 of the ceramic carrier, T(K) is an internal temperature of the ceramic carrier, D(cc/g) is a amount of fine pores of not more than 2 μm in the ceramic carrier, and S(%) is a surface porosity indicating the ratio of an area of opening parts of the fine pores on a surface of the ceramic carrier.

15 Claims, 7 Drawing Sheets

CERAMIC CATALYST BODY

CROSS-REFERENCE TO RELATED APPLICATION

This application is related to and claims priority from Japanese Patent Application No. 2006-245698 filed on Sep. 11, 2006, the contents of which are hereby incorporated by reference.

BACKGROUND OF THE INVENTION

1. Field of the Invention

The present invention relates to a ceramic catalyst body capable of purifying an exhaust gas discharged from an internal combustion engine such as an automobile engine of an automobile.

2. Description of the Related Art

There is a ceramic catalyst body composed of a ceramic carrier which supports a catalyst therein capable of purifying an exhaust gas discharged from an internal combustion engine for a vehicle such as a diesel engine. Such a ceramic catalyst body has a plurality of cells therein. Each cell is partitioned or surrounded by porous cell walls which support catalyst particles thereon. A plurality of those cells in the ceramic catalyst body is arranged in a honeycomb shape.

The ceramic catalyst body is placed in the passage of an exhaust gas discharge pipe through which the exhaust gas is discharged from an internal combustion engine to the outside of a vehicle. The exhaust gas of a high temperature passing through the ceramic catalyst body enables the catalyst in the ceramic carrier to be activated.

However, such a ceramic catalyst body involves a following drawback. In a strict enforcement of a recent legal control in the field of vehicle exhaust gas, there has been proposed that the ceramic catalyst body is placed more closer to the engine in order to activate catalyst components supported in the ceramic catalyst body as fast as possible. This proposal intends to increase the temperature of the catalyst by the exhaust gas so that the catalyst components are activated more quickly.

Although increasing the temperature of the catalysts can promote the activation thereof, the catalyst components are easily separated from the ceramic carrier in the ceramic catalyst body under a high temperature condition. The separation of the catalyst components from the ceramic carrier causes deterioration in the durability of the ceramic catalyst body. For this reason, there is a strong requirement of providing a ceramic catalyst body capable of suppressing the separation of catalyst components from the ceramic carrier and capable of maintaining the purifying performance of the catalyst capable of purifying an exhaust gas even if used under a high temperature environment.

For example, Japanese patent laid open publication No. JP S64-4249 has disclosed a cordierite honeycomb-structure ceramic carrier having an improved catalyst-supporting capability which is achieved by adjusting various parameters of a honeycomb structure body, which is a base body of the cordierite honeycomb structure ceramic carrier, such as a porosity or a pore ratio, a pore distribution, and a thermal expansion coefficient.

Japanese patent laid open publication No. JP H9-262484 has disclosed a ceramic honeycomb catalyst having an improved anti-separation capability of catalyst by adjusting a thermal expansion coefficient of a ceramic honeycomb-structure base body and by adjusting a difference of a thermal expansion coefficient before and after the ceramic honeycomb-structure base body supports the catalyst.

Japanese patent laid open publication No. JP 2002-59009 has disclosed a cordierite honeycomb structure body having an improved adhesion capability between a catalyst and a coating layer made of γ-alumina and the like formed on a diffusion prevention layer by controlling a thickness of the diffusion prevention layer of being not more than an average pore size of the cordierite honeycomb structure body, where the diffusion prevention layer is formed on the surface of the cordierite honeycomb structure body and capable of preventing the diffusion of the catalyst and the diffusion prevention layer is formed on a surface of the cordierite honeycomb structure body and capable of preventing the diffusion of catalyst components.

Japanese patent laid open publication No. JP H6-165939 has disclosed a cordierite honeycomb structure body having an improved anti-thermal shock after it supports a high specific surface material, where improved anti-thermal shock is obtained by setting a thermal expansion coefficient of the cordierite honeycomb structure body to a value of not less than $1.0 \times 10^{-6}/°C$. at a temperature range of 40 to 800° C.

Japanese patent laid open publication No. JP 2003-205246 has disclosed a method of producing a catalyst body of an improved strength. In the method, a ceramic carrier of a high porosity is firstly produced. The ceramic carrier is compacted by an after-treatment such as a coating step in order to obtain the ceramic carrier of a low porosity while suppressing the invasion of alkali metal.

Japanese patent laid open publication No. JP 2000-296340 has disclosed a ceramic honeycomb structure body capable of suppressing deterioration in its anti-thermal shock by controlling its characteristic as follows: The ratio of area of a pore within a range of not less than one time to not more than ⅓ times of an average particle size of a high specific area material is within a range of 1 to 12% when a minimum diameter of the pore on a surface of a cell wall observed from a vertical direction to the surface; and the ratio of area of a pore having a minimum radius of not less than 10% of an average particle size of a high specific area material is not more than 10% when the pore on the surface of the cell wall is observed in a direction which is vertical to the surface of the cell wall.

Japanese patent laid open publication No. JP 2002-191985 has disclosed a cordierite honeycomb structure body having an improved adhesion of a highly specific-area material by controlling an amount of pores having a diameter of 0.5 to 5 µm to become not more than 30% of a total amount of pores.

However, because those techniques disclosed in the above related-art documents do not always suppress the separation of catalyst components from a ceramic carrier, there is a strong demand to provide a ceramic catalyst body of superior durability and reliability capable of adequately maintaining the anti-separation performance from the ceramic carrier.

SUMMARY OF THE INVENTION

It is an object of the present invention to provide a ceramic catalyst body with superior durability and reliability capable of adequately suppressing the separation of catalysts supported in a ceramic carrier even if used at a high temperature.

To achieve the above purposes, the present invention provides a ceramic catalyst body has a ceramic carrier made of cordierite. The ceramic carrier supports a catalyst therein. The ceramic carrier has a plurality of cells partitioned or surrounded by a plurality of cell walls arranged in a honeycomb shape. The ceramic catalyst body has a separation ratio H of catalyst expressed by the formula (1), H=217.254+

$$(-0.167) \times T + 0.345 \times D + 28.731 \times \Delta\ CTE - 3.343 \times S \quad \ldots \quad (1),$$

where $\Delta\ CTE(\times 10^{-6}/°C.)$ is a difference ($=C1-C2$) between a thermal expansion coefficient C1 of the ceramic catalyst body and a thermal expansion coefficient C2 of the ceramic carrier, T(K) is an internal temperature of the ceramic carrier, D(cc/g) is a amount of fine pores of not more than 2 μm in the ceramic carrier, and S(%) is a surface porosity indicating the ratio of an area of opening part of the fine pores on a surface area of the ceramic carrier.

The ceramic catalyst body according to the present invention has the ceramic carrier in which the catalyst is supported. The ceramic carrier is made of cordierite and has a plurality of the cells partitioned or surrounded by a plurality of the cell walls (or partition walls). That is, the ceramic carrier is a honeycomb structure body made of ceramic cordierite. The ceramic catalyst body has the separation ratio of catalyst of not less than 35% calculated by the formula (1) defined using the difference $\Delta\ CTE(\times 10^{-6}/°C.)$ between the thermal expansion coefficient C1 of the ceramic catalyst body and the thermal expansion coefficient C2 of the ceramic carrier, the internal temperature T (K) of the ceramic carrier, the amount D(cc/g) of the fine pore of not more than 2 μm in the ceramic carrier, and the surface porosity S(%) indicating the ratio of opening part on a surface of the ceramic carrier.

Using the formula (1) can control the ceramic catalyst body to be produced so that the separation ratio H of the catalyst is set to a value of not more than 35% by adjusting the relationship (for example, the difference $\Delta\ CTE(\times 10^{-6}/°C.)$) between the ceramic catalyst body and the ceramic carrier and by adjusting the characteristics of the ceramic carrier such as the fine pore amount D and the surface porosity S thereof. That is, it is possible to adequately control the separation ratio of the catalyst in the ceramic catalyst body, and in other words, the anti-separation capability of the catalyst can be adequately maintained.

The ceramic catalyst body according to the present invention described above can be applied as a catalyst body capable of purifying exhaust gas discharged from an internal combustion engine of automobiles. Even if used under hard environment such as at high temperature, it is possible to suppress the occurrence of separating the catalyst components from the ceramic carrier and possible to continue the stable purifying capability of purifying the exhaust gas. The ceramic catalyst body according to the present invention has a superior durability and is highly reliable.

According to the present invention, it is possible to adequately suppress the separation of the catalyst from the ceramic carrier even if used under a high-temperature condition and to provide the ceramic catalyst body with a superior durability and a high reliability.

In the ceramic catalyst body according to the present invention, the thermal expansion coefficient C1 is a thermal expansion coefficient of the ceramic catalyst body in which the ceramic carrier supports the catalyst. The thermal expansion coefficient C2 is a thermal expansion coefficient of the ceramic carrier which does not support any catalyst.

The difference $\Delta\ CTE(\times 10^{-6}/°C.)$ ($=C1-C2$) indicates the increased amount of the thermal expansion coefficient caused by the catalyst supported in the ceramic carrier. The difference $\Delta\ CTE(\times 10^{-6}/°C.)$ can be controlled by varying the amount of the catalyst to be supported by the ceramic carrier and the particle size thereof.

The fine pore amount D is a amount of the fine pores, and the average particle size (diameter) thereof is not more than 2 μm. The fine pore amount D can be adjusted by varying the particle size of ceramic raw-material components of the ceramic carrier such as talc and aluminum hydroxide or by varying rising temperature speed of, a temperature of, and a length of time of the firing on producing the ceramic carrier.

The surface porosity S indicates the ratio of the area of the opening part on the surface of the ceramic carrier. The surface porosity S can be controlled by varying the particle size of the raw-material components and by varying the firing temperature and the like.

The inside temperature T is a temperature of the ceramic carrier (the ceramic catalyst carrier) under a use environment. For example, on using the ceramic carrier as the exhaust gas purifying filter capable of purifying exhaust gas discharged from an internal combustion engine of a vehicle, the inside temperature T is the maximum temperature of the inside of the ceramic carrier, which is placed on a way of the exhaust pipe in the vehicle, through which the exhaust gas flows from the internal combustion engine to the outside of the vehicle.

If the separation ratio H (as the calculated value) of the catalyst exceeds 35%, there is a possibility of not adequately supporting the necessary amount of the catalyst in the ceramic carrier. This case decreases the exhaust gas purifying performance of the ceramic catalyst body.

According to another aspect of the present invention, it is preferred that the thermal expansion coefficient C1 of the ceramic catalyst body is not more than $3 \times 10^{-6}/°C.$ If the thermal expansion coefficient C1 of the ceramic catalyst body exceeds $3 \times 10^{-6}/°C.$, there is a possibility of cracks occurring and breakage in the ceramic carrier by thermal stress generated in the ceramic carrier. Therefore it is preferred for the ceramic catalyst body to have the thermal expansion coefficient C1 of not more than $3 \times 10^{-6}/°C.$, in particular, more preferred to have the thermal expansion coefficient C1 of not more than $1.5 \times 10^{-6}/°C.$ According to another aspect of the present invention, it is preferred that the thermal expansion coefficient C2 of the ceramic carrier is not more than $1 \times 10^{-6}/°C.$ If the thermal expansion coefficient C2 of the ceramic carrier exceeds $1 \times 10^{-6}/°C.$, there is a possibility of generating cracks and breakage in the ceramic carrier by thermal stress generated in the ceramic carrier. Therefore it is preferred for the catalyst carrier to have the thermal expansion coefficient C2 of not more than $1 \times 10^{-6}/°C.$, in particular, more preferred to have the thermal expansion coefficient C2 of not more than $0.8 \times 10^{-6}/°C.$ According to another aspect of the present invention, it is preferred that the difference $\Delta\ CTE(\times 10^{-6}/°C.)$ between the thermal expansion coefficient C1 of the ceramic catalyst body and the thermal expansion coefficient C2 of the ceramic carrier is not more than $2 \times 10^{-6}/°C.$ If the difference $\Delta\ CTE(\times 10^{-6}/°C.)$ between the thermal expansion coefficients exceeds $2 \times 10^{-6}/°C.$, there is a possibility that the catalyst components could be separated from the ceramic carrier. This causes the deterioration of the exhaust gas purifying performance of the ceramic catalyst body.

According to another aspect of the present invention, it is preferred that the surface porosity S of the ceramic carrier is within a range of 3 to 30%. In a situation where the surface porosity S of the ceramic carrier is of less than 3%, there is a possibility that the ceramic carrier does not have an adequate amount of catalyst therein, there is then a possibility of decreasing the adhesion of the catalyst to the ceramic carrier. On the other hand, in case of having surface porosity S of the ceramic carrier of more than 30%, there is a possibility of decreasing the strength of the ceramic carrier against stress, such as thermal stress.

According to another aspect of the present invention, it is preferred that the ceramic catalyst body has an entered amount of the catalyst of not more than 25% which indicates a ratio of an area of the catalyst entered in the ceramic carrier against an optional area on a cross section of the ceramic carrier. In a case of more than 25% of the entered amount of the catalyst in the ceramic carrier, there is a possibility of promoting the separation of the catalyst components from the ceramic carrier by the thermal stress generated between the ceramic catalyst body and the ceramic carrier because the difference $\Delta$ CTE($\times 10^{-6}$/° C.) between the thermal expansion coefficients C1 and C2 becomes large.

According to another aspect of the present invention, it is preferred that the ceramic catalyst body has an entered amount of the catalyst of not more than 15% which indicates a ratio of an area of the catalyst entered in the ceramic carrier against an optional area on a cross section of the ceramic carrier. This case can suppress the increase of the difference $\Delta$ CTE($\times 10^{-6}$/° C.) between the thermal expansion coefficients C1 and C2, and thereby suppress the generation of cracks and damage or breakage in the ceramic carrier.

According to another aspect of the present invention, it is preferred that the catalyst is one or more selected from metals Pt, Rh and Pd. In a situation where these metals are used, the ceramic catalyst body can efficiently purify the exhaust gas based on the catalytic reaction of the selected catalyst such as Pt, Rh, or Pd.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
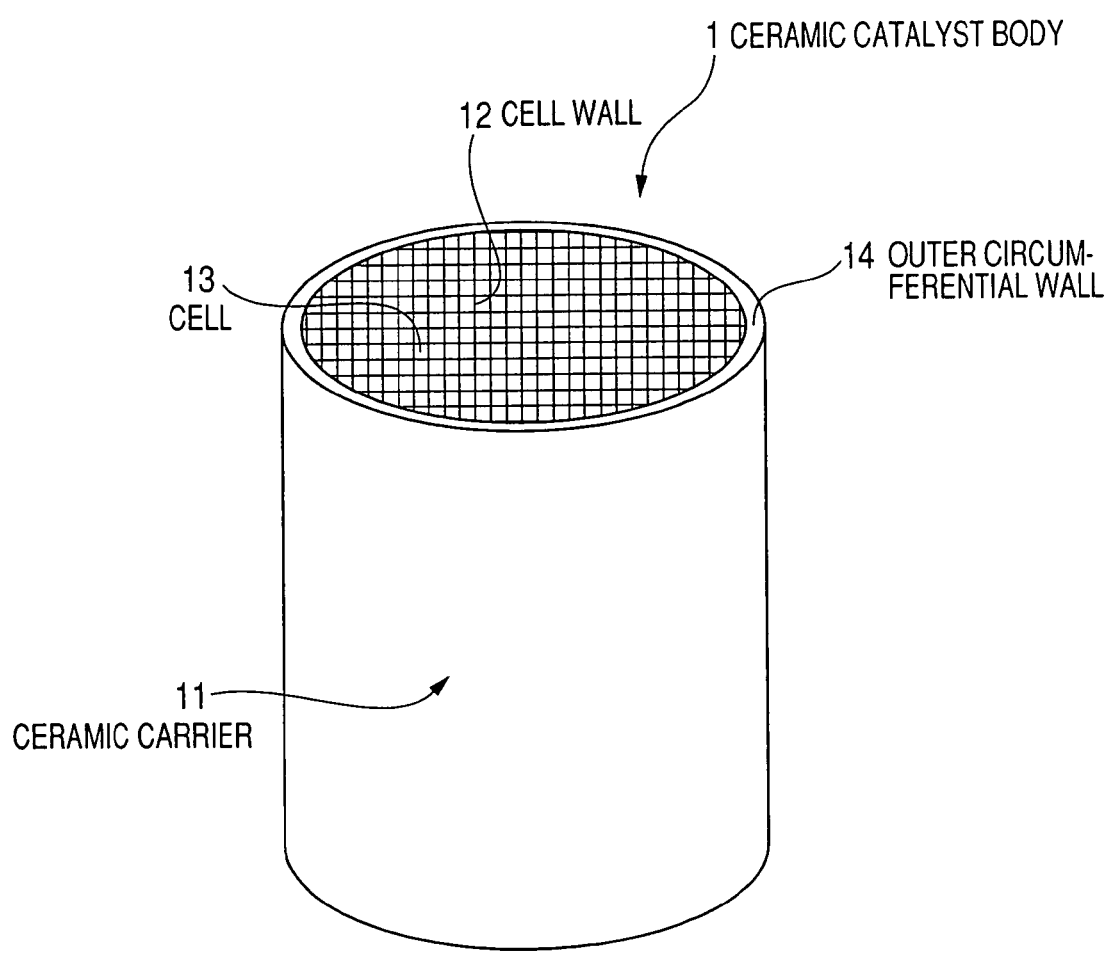
FIG. 1 is a perspective view of a ceramic catalyst body according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a ceramic catalyst body according to a first embodiment of the present invention with reference to FIG. 1 to FIG. 5.

In the first embodiment, the ceramic catalyst body was produced under various conditions so as to quantitatively evaluate a separation ratio of catalyst from the ceramic catalyst body. The ceramic catalyst body according to the present invention is applicable to an exhaust gas purifying catalyst body to be mounted on an automobile engine, for example.

First, a description will now be given of a basic configuration of the ceramic catalyst body according to the first embodiment.

As shown in FIG. 1, the ceramic catalyst body 1 has a ceramic carrier 11 of a cylindrical shape capable of supporting catalyst components. The ceramic carrier 11 is made mainly of cordierite and is a honeycomb structure body composed of a plurality of cells 13 which are partitioned or surrounded by a plurality of cell walls 12 (or a plurality of partition walls) arranged in a lattice shape. The outer surface of the ceramic carrier 11 is covered with an outer circumferential wall 14 of a cylindrical shape.

Catalyst is supported on the surface of the cell walls 12 in the ceramic carrier 11. The ceramic catalyst body according to the first embodiment of the present invention uses metals Pt and Rh as the catalyst elements. The embodiments of the present invention use Ce, $O_2$, and $ZrO_2$ as a promoter for the catalyst.

The ceramic carrier 11 in the ceramic catalyst body has an outer radius of 103.0 mm, a length of 105.0 mm, and a thickness of the outer circumferential wall of 0.4 mm.

A description will be given of the method of producing the ceramic catalyst body 1. The method of producing the ceramic catalyst body 1 according to the present invention performs following steps:

Step of extruding and molding ceramic raw material in order to make a honeycomb shaped body as a green body;

Step of cutting the honeycomb shaped body by a desired length;

Step of drying the honeycomb shaped body; and

Step of firing the honeycomb shaped body in order to produce the honeycomb structure body (as the ceramic carrier 11).

In particular, the extrusion molding step uses an extrusion molding die (not shown) having plural slit grooves which correspond to the shape of the cell walls 12.

The extrusion molding step uses the ceramic raw material composed mainly of kaolin, fused silica, aluminum hydroxide, alumina, talc, and carbon particles and the like which are mixed so as to make cordierite whose final chemical weight composition is 45.0-55.0 wt % of $SiO_2$, 33.0-42.0 wt % of $Al_2O_3$, and 12.0-18.0 wt % of MgO. Water and binders of a desired amount are added into those ceramic raw powders and mixed together to make the ceramic raw material.

The ceramic raw material prepared above is extruded and molded by using an extrusion molding die in order to make the honeycomb molded body (as a precursor or a green body of ceramic carrier 11). Following, the cutting step, the drying step, and the firing step are performed in order. In the cutting step, the precursor of the ceramic carrier 11 is cut into a plurality of parts of a desired length. In the drying step, the precursor of the ceramic carrier 11 is dried by a microwave dryer. In the firing step, the dried ceramic carrier 11 is fired at a maximum temperature of 1400° C. The ceramic carrier shown in FIG. 1 can be produced by the above steps.

Next, the catalyst will be supported on the ceramic carrier 11. In a concrete manner, a nitride chemical solution containing Pt and Rh as the catalyst is added into a water solution while mixing $CeO_2/ZrO_2$ compound as a promoter for the catalyst in the water solution, and then the water solution is evaporated. As a result, the carrier powder in which Pt and Rh are supported on the surface of $CeO_2/ZrO_2$ compound can be obtained.

Next, the carrier power is fired at the temperature of 250° C. for an hour in order to eliminate nitrate from the carrier power. Following, alumina, binder and the like are added into the carrier powder so as to make the slurry. The slurry is then treated by a ball mill in order to make the carrier slurry of a uniform particle size. The ceramic carrier 11 is dipped into the carrier slurry for a specified length of time, and then pulled out of the carrier slurry. The above steps provide the ceramic carrier 11 in which the carrier slurry is adhered onto the surfaces of the cell walls 12. The ceramic carrier 11 is dried at 120° C. for 20 minutes, and fired at 500° C. for two hours.

It is thereby possible to provide the ceramic catalyst body 1 in which the catalyst is supported in the ceramic carrier 11.

Next, a description will now be given of measurement of the separation ratio of catalyst from the ceramic carrier with reference to FIG. 2 to FIG. 5.

In the experimental measurement of the separation ratio of catalyst, two groups A1 and A2 of the ceramic catalyst bodies were prepared.

Those ceramic catalyst bodies of the two groups A1 and A2 were produced under various different conditions.

Group A1 includes a plurality of the ceramic catalyst bodies of a surface porosity of 5%, a different porosity Dp, and a different difference Δ CTE of thermal expansion coefficients.

Group A2 includes a plurality of the ceramic catalyst bodies of a surface porosity of 10%, a different porosity Dp, and a different difference Δ CTE of thermal expansion coefficients The difference Δ CTE($\times 10^{-6}$/° C.) of thermal expansion coefficients is a difference (C1−C2) between a thermal expansion coefficient C1 of the ceramic catalyst body 1 and a thermal expansion coefficient C2 of the ceramic carrier 11.

The thermal expansion coefficient C1 is a thermal expansion coefficient of the ceramic catalyst body 1 in which the ceramic carrier supports the catalyst. The thermal expansion coefficient C2 is a thermal expansion coefficient of the ceramic carrier which does not support any catalyst.

Such a difference Δ CTE($\times 10^{-6}$/° C.) of thermal expansion coefficients can be adjusted by varying an amount of catalyst Pt and Rh supported on the ceramic carrier 11, a particle size (or a particle diameter) of a catalyst component, and others.

The thermal expansion coefficient C1 or C2 can be measured using an ordinary measuring apparatus capable of measuring a thermal expansion coefficient (CTE). In the first embodiment of the present invention, the thermal expansion coefficient C2 is set to the value of $0.7 \times 10^{-6}$/° C.

The fine pore ratio Dp(%) is a ratio of a fine pore amount D (cc/g) of not more than 2 μm against the total pore amount Da (cc/g) in the ceramic carrier 11. That is, the relationship Dp=100×D/Da is obtained.

The total pore amount Da and the fine pore amount D can be adjusted by varying a particle size of each of talc, aluminum oxide and the like, or varying a firing speed, a firing temperature, a firing length of time during the production of the ceramic carrier 11.

The total pore amount Da and the fine pore amount D can be measured by Mercury porosimeter.

The surface porosity S (%) is a ratio of the opening parts (pore area) to the surface area of the ceramic carrier 11. The surface porosity S (%) can be controlled by varying the pore radius (or a particle size) of raw material components of the ceramic carrier 11 and the firing temperature during the manufacturing.

The surface porosity S (%) can be measured by observing the presence of pores on the surface of the ceramic carrier 11 using a SEM (scanning electron microscope) or a laser scanning microscopy or the like.

Next, a description will now be given of an actual manner of how to measure the separation ratio of catalyst in each ceramic catalyst body.

First, each of the ceramic carriers in the groups A1 and A2 is cut to obtain a square-bar sample of 18.0 mm×18.0 mm×18.0 mm (hereinafter, referred to as "a sample piece"). The sample piece is cut from the opposite end part side of the ceramic carrier 11 whose one side has been dipped in the carrier slurry. The catalyst amount "m1" supported on the sample piece is measured in advance.

Next, a weight "M1" of the sample piece is measured. Following, the temperature of the sample piece rises by 40° C./minutes, and is kept at 1000° C. or 1100° C. for 5 hours. This temperature is designated by reference character "t", namely, t=1000° C. or 1100° C.

The catalyst components supported on the sample piece is separated from the sample piece using an ultrasonic cleaning apparatus of 200 W for 10 minutes. After this separation step, the weight M2 of the sample piece is measured. The experimental separation ratio H' (%) of catalyst is thereby obtained by the following formula.

$$H'(\%)=100\times(M1-M2)/m1.$$

The measurement manner described above was performed for all of the sample pieces which were produced under the different conditions.

Figure 2:
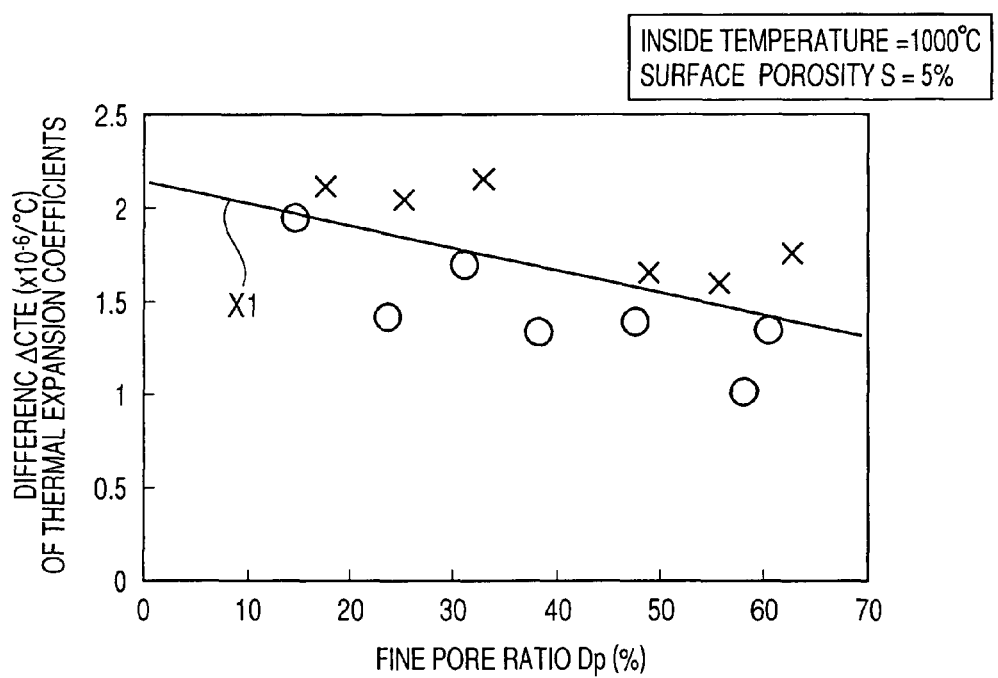
FIG. 2 is a diagram showing a relationship between the difference $\Delta$ CTE of thermal expansion coefficients and a fine pore ratio in the ceramic catalyst body according to the first embodiment of the present invention.
Figure 3:
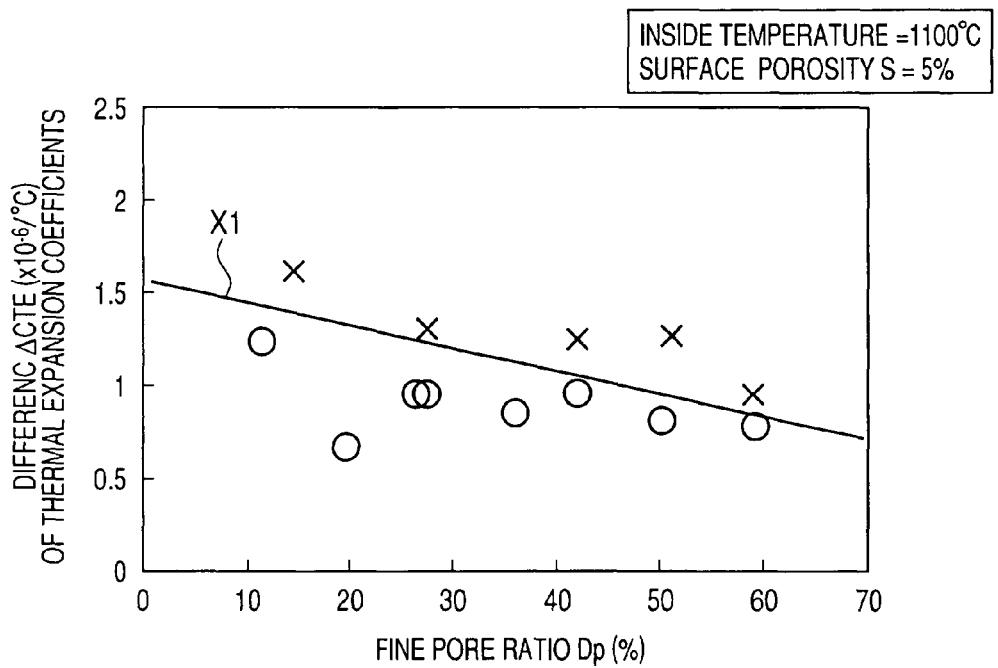
FIG. 3 is a diagram showing a relationship between the difference $\Delta$ CTE of thermal expansion coefficients and a fine pore ratio in the ceramic catalyst body according to the first embodiment of the present invention.

FIG. 2 to FIG. 5, each shows the relationship between the difference Δ CTE (=C1−C2) of thermal expansion coefficients C1 and C2 and the fine pore ratio Dp(%) in the sample pieces as the ceramic catalyst body. In particular, FIG. 2 and FIG. 3 show the relationship between the difference Δ CTE of thermal expansion coefficients and the fine pore ratio Dp(%) in the sample pieces having the surface porosity of 5% which belong to the group A1 treated at the temperature of 1000° C. and 1100° C., respectively.

Figure 4:
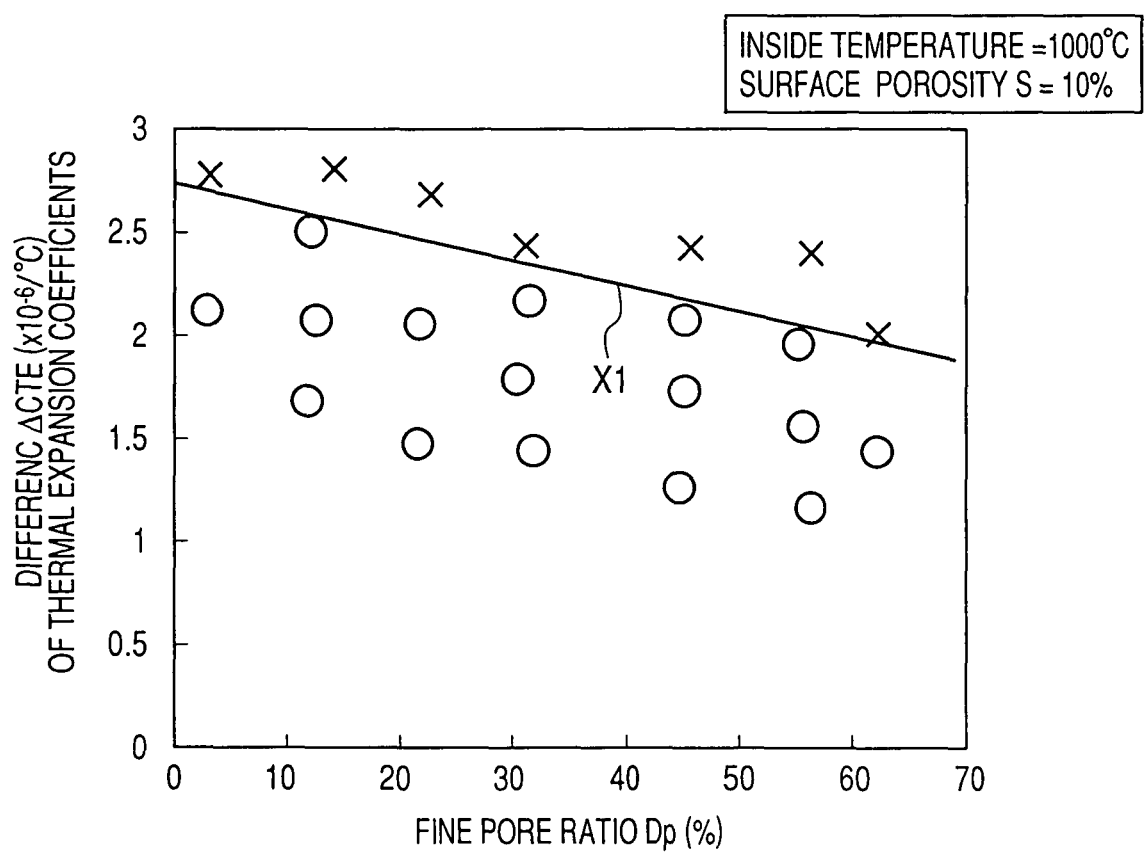
FIG. 4 is a diagram showing a relationship between the difference $\Delta$ CTE of thermal expansion coefficients and a fine pore ratio in the ceramic catalyst body according to the first embodiment of the present invention.
Figure 5:
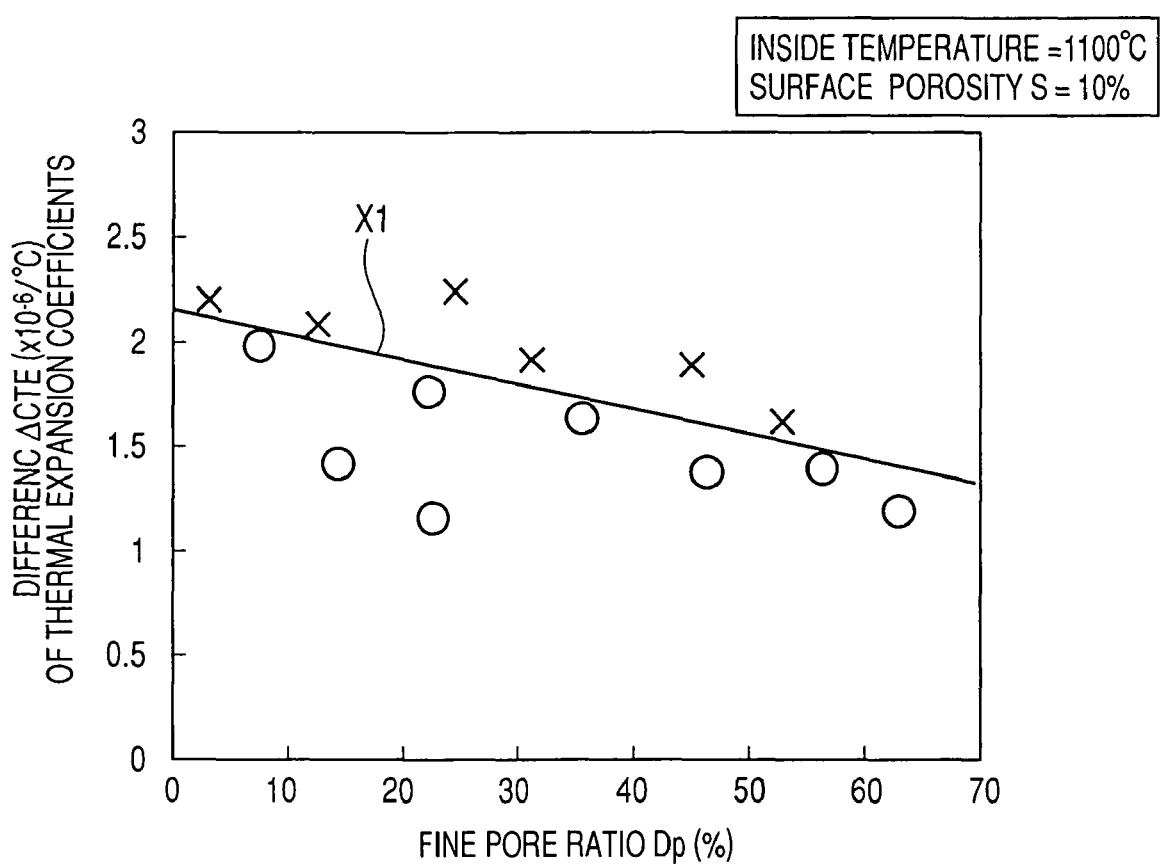
FIG. 5 is a diagram showing a relationship between the difference $\Delta$ CTE of thermal expansion coefficients and a fine pore ratio in the ceramic catalyst body according to the first embodiment of the present invention.

FIG. 4 and FIG. 5 show the relationship between the difference Δ CTE of thermal expansion coefficients and the fine pore ratio Dp(%) in the sample pieces having the surface porosity of 10% which belong to the group A1 treated at the temperature of 1000° C. and 1100° C., respectively.

In FIG. 2 to FIG. 5, the vertical line indicates the difference Δ CTE($\times 10^{-6}$/° C.) of the thermal expansion coefficients and the horizontal line indicates the fine pore ratio Dp(%).

The evaluation of the anti-separation capability of each sample piece is based on whether or not each sample piece satisfies following matters (a) and (b):

(a) The ceramic catalyst body 1 has an adequate exhaust gas purifying performance; and (b) The separation ratio H' of catalyst is not more than 35%, which means no practical difficulty.

In FIG. 2 to FIG. 5, reference symbol (×) indicates a rejected sample piece with practical difficulty (>35%), and reference symbol (○) indicates an acceptance sample piece of no practical difficulty (<=35%).

Next, a description will be given of an acceptance quality level of the ceramic catalyst body 1 (the allowable sample pieces) according to the present invention with reference to FIG. 2 to FIG. 5.

The allowable ceramic catalyst body 1 having the acceptance quality level according to the present invention must satisfy the following calculated separation ratio H of not more than 35%.

$$H=217.254+(-0.167) \times T+0.345 \times D+28.731 \times \Delta CTE - 3.343 \times S \quad (1),$$

where H designates the calculated separation ratio, $\Delta$ CTE (=C1−C2) denotes a difference of thermal expansion coefficients C1 and C2, T indicates a temperature (K), D designates a fine pore amount (cc/g) of not more than 2 μm, and S indicates a surface porosity (%).

First, the constant values, that is, the surface porosity S (5% or 10%) and the temperature t (1000° C. or 1100° C.) are inserted into the formula (1). At this time, the temperature "t" is converted to the temperature T(K). The value of 35% is set into the calculated separation ratio H, as the standard value of the present invention. The relationship between the difference $\Delta$ CTE and the fine pore amount D (cc/g) is then obtained. Following, the fine pore amount D (cc/g) is converted to the fine pore ratio Dp (%) by the conversion formula, Da=10×D/Da, where Da=0.1 to 0.3 (cc/g), in order to obtain the formula indicating the relationship between the difference $\Delta$ CTE of thermal expansion coefficients and the fine pore ratio Dp.

The relation formula is shown in each of FIG. 2 to FIG. 5 as the reference line X1 which is obtained by the above calculation. The area which is below the reference line X1 designated by the formula (1), that is, the area of not more than 35% indicates the sample pieces which can satisfy the acceptance quality level of (or the allowable condition of) the present invention.

As clearly shown from FIG. 2 to FIG. 5, all of the sample pieces having the experimental separation ratio H' (<=35%) are presence under the line X1 defined by the relation formula (1) (indicating the calculated separation ratio H). That is, all of the sample pieces having the experimental separation ratio H' of not more than 35% (<=35%) are the ceramic carriers according to the present invention, and other sample pieces designated by reference character "×" shown in FIG. 2 to FIG. 5 do not satisfy the acceptance quality level according to the present invention.

As clearly understood from FIG. 2 to FIG. 5, the calculated separation ratio H obtained by the relation formula (1) can reflect the experimental separation ratio H' actually measured. It is therefore possible to control the separation ratio of catalyst from the ceramic carrier, namely, from the ceramic catalyst body, by adjusting those various parameters such as the difference $\Delta$ CTE of thermal expansion coefficients, the temperature T (K), the fine pore amount D (cc/g) of not more than 2 μm, and the surface porosity S (%). This means to adequately keep the anti-separation capability of catalyst from the ceramic carrier.

Second Embodiment

A description will now be given of the ceramic catalyst body according to the second embodiment of the present invention having a different difference $\Delta$ CTE of thermal expansion coefficients and other constant parameters.

In the second embodiment, the difference $\Delta$ CTE of thermal expansion coefficients is controlled by adjusting the entered amount of catalyst to be entered into the ceramic carrier 11. That is, the difference $\Delta$ CTE of thermal expansion coefficients is controlled by the degree of entering catalyst components to the inside of the ceramic carrier 11. The amount of catalyst components to be entered in the ceramic carrier 11 can be adjusted by varying the particle size or diameter of raw-material components contained in the carrier slurry such as the particle size of alumina and $CeO_2$.

A description will now be given of the manner how to measure the entered amount of catalyst in the ceramic carrier 11.

Figure 6:
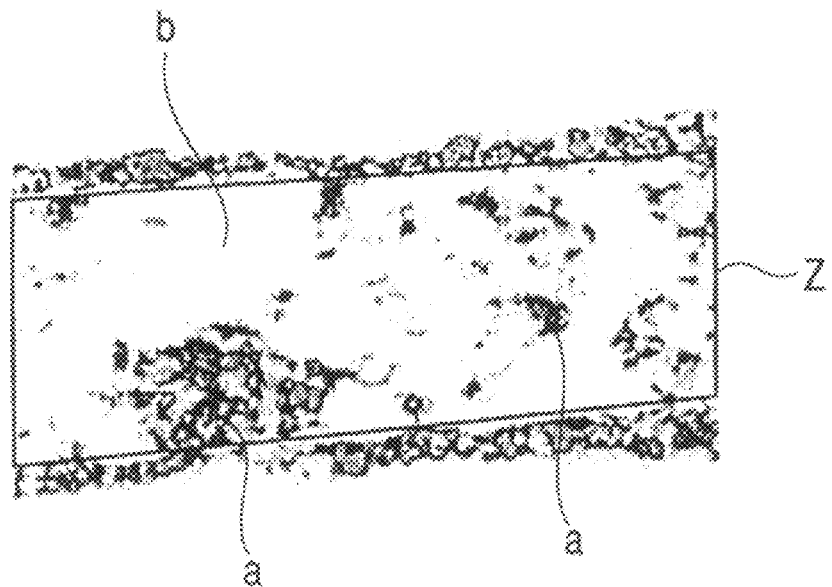
FIG. 6 is a diagram showing measurement result of the ceramic catalyst body using EPMA according to a second embodiment of the present invention.
Figure 7:
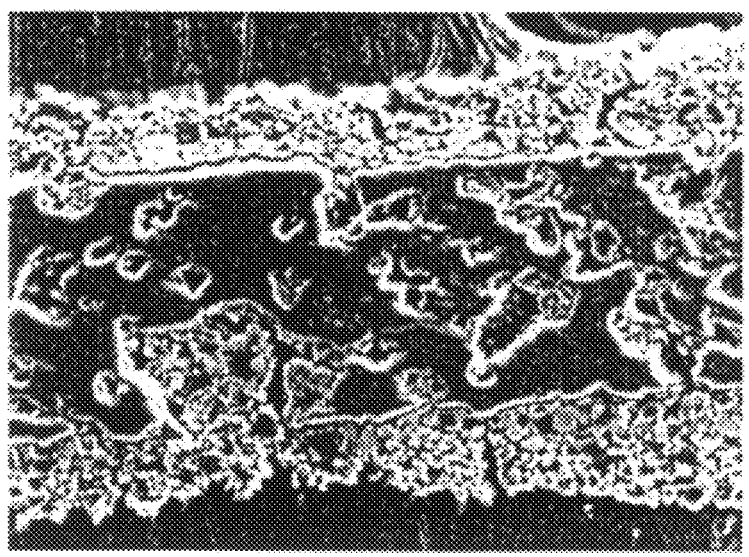
FIG. 7 is a diagram showing measurement result of the ceramic catalyst body using SEM according to the second embodiment.

FIG. 6 is a diagram showing the measurement result of the ceramic catalyst body using EPMA according to the second embodiment of the present invention. FIG. 7 is a diagram showing the measurement result of the ceramic catalyst body using SEM (Scanning Electron Microscope) according to the second embodiment.

As shown in FIG. 6, element mapping analysis is performed per optional sectional area in the ceramic carrier 11 using EPMA (Electron prove micro analyzer) in order to investigate the distribution of catalyst components on the ceramic carrier 11.

The area Z in the ceramic carrier 1 is extracted while comparing the EPMA experimental result shown in FIG. 6 with the SEM experimental result shown in FIG. 7.

As shown in FIG. 6, the area Z is binarized in order to divide it into two parts, the catalyst part "a" and the ceramic carrier part "b" including the pores having no catalyst.

The amount Y (%) of entering catalyst into the ceramic carrier (hereinafter, referred to as "the entered amount Y(%) of catalyst") can be obtained by the following formula.

$$Y(\%)=100 \times (\text{area of catalyst part ``}a\text{''})/(\text{area } Z).$$

Next, the actual ceramic catalyst body 1 is produced in which the ceramic carrier 11 supports the catalyst, and the actual relationship between the difference $\Delta$ CTE of thermal expansion coefficients and the entered amount Y(%) of catalyst was obtained.

The ceramic carrier 11 used in the experiment according to the second embodiment has the fine pore amount D of not more than 2 μm of 0.05 cc/g and the surface porosity S of 10%. Other conditions in the production of the ceramic catalyst body according to the second embodiment are the same of those of the ceramic catalyst body according to the first embodiment.

The supported amount of catalyst in the ceramic carrier 11 of the second embodiment is 270 g/L. This supported amount of catalyst is defined by the supported amount of catalyst against the amount of the ceramic carrier 11.

In the second embodiment, an inside temperature difference $\Delta$ T and the difference $\Delta$ CTE of thermal expansion coefficients of the ceramic carrier 11 were measured when the ceramic catalyst body 1 was used as the exhaust gas purifying catalyst for an automobile engine. The inside temperature difference $\Delta$ T means the difference between the maximum temperature and the minimum temperature at the inside of the ceramic carrier 11 under a crack criteria where cracks are generated in the ceramic carrier 11 at 1050° C.

A description will now be given of the experimental results in the second embodiment with reference to FIG. 8 and FIG. 9.

Figure 8:
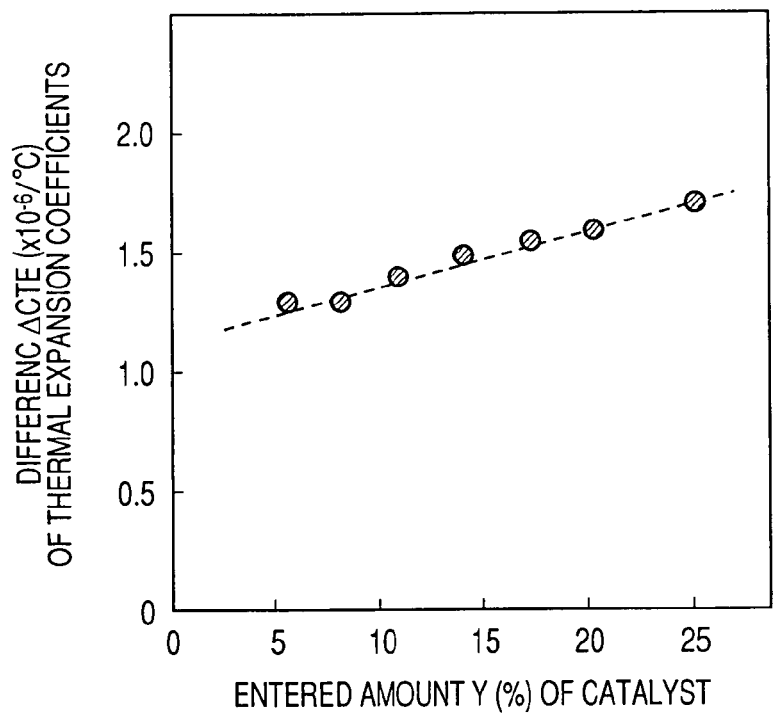
FIG. 8 is a diagram showing a relationship between the difference $\Delta$ CTE of thermal expansion coefficients and an invasion amount in the ceramic catalyst body according to the second embodiment.

FIG. 8 is a diagram showing a relationship between the difference $\Delta$ CTE of thermal expansion coefficients and the entered amount Y of catalyst in the ceramic catalyst body 1. In FIG. 8, the vertical line indicates the difference $\Delta$ CTE ($\times 10^{-6}/°$ C.) of thermal expansion coefficients and the horizontal line indicates the entered amount Y(%).

Figure 9:
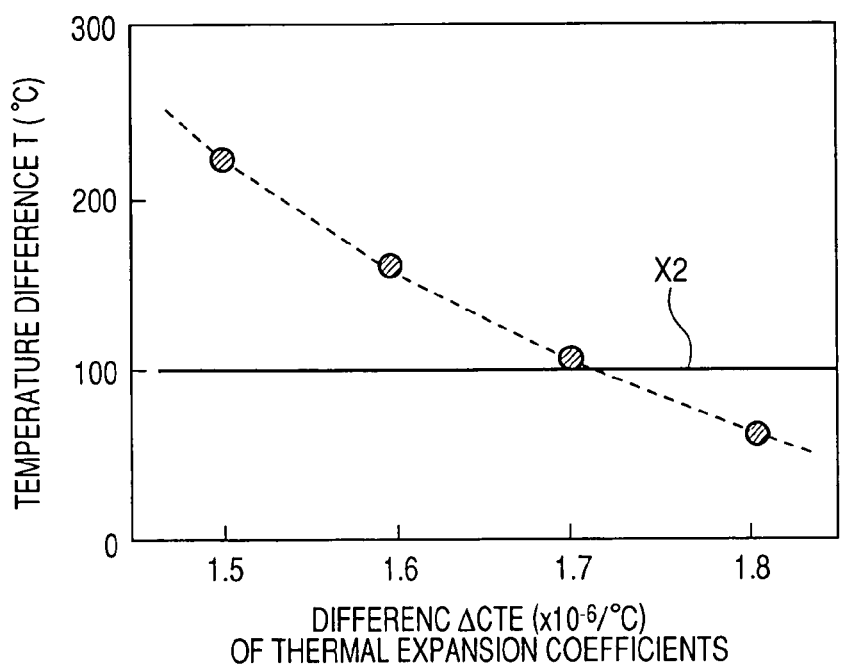
FIG. 9 is a diagram showing a relationship between a temperature difference and a thermal expansion coefficient in the ceramic catalyst body according to the second embodiment.

FIG. 9 is a diagram showing a relationship between the temperature difference $\Delta$ T (° C.) and the difference $\Delta$ CTE ($\times 10^{-6}/°$ C.) of thermal expansion coefficients in the ceramic catalyst body 1. In FIG. 9, the vertical line indicates the temperature difference $\Delta$ T (° C.), and the horizontal line indicates the difference $\Delta$ CTE($\times 10^{-6}/°$ C.) of thermal expansion coefficients. In FIG. 9, the reference line X2 indicates the reference temperature difference of 100° C. and the temperature difference $\Delta$ T generated in the ceramic carrier 11 in practical use.

As clearly understood from FIG. 8 and FIG. 9, considering the use of the ceramic catalyst body 1 under the environment at 1050° C., the temperature difference $\Delta$ T exceeds the reference line X2 when the entered amount Y of catalyst of not less than 25%, because the difference $\Delta$ CTE($\times \mathbf{10^{-6}}/°$ C.) of thermal expansion coefficients becomes not more than 1.7($\times 10^{-6}/°$ C.) and the temperature difference $\Delta$ T becomes not less than 100° C. Accordingly, it is possible to adequately keep the durability and the anti-thermal shock of the ceramic catalyst body 1 even if used under the environment at 1050° C. This performance of the ceramic catalyst body 1 has no practical difficulty.

Further, it is possible to further enhance the durability and the anti-thermal shock capability when the entered amount Y of catalyst is not more than 15%, because the difference $\Delta$ CTE($\times 10^{-6}/°$ C.) of thermal expansion coefficients becomes not more than 1.5($\times 10^{-6}/°$ C.) and the temperature difference $\Delta$ T becomes 200° C. or more.

Still further, the ceramic catalyst body 1 has no practical difficulty even if used under the condition at 1100° C. because the temperature difference $\Delta$ T becomes 150° C.

Third Embodiment

A description will now be given of an experiment to obtain the formula (1) which determines the optimum condition to produce the ceramic catalyst body of the acceptance quality level according to the present invention with reference to Table 1 and FIG. 10.

First, two types of the ceramic carriers according to the embodiments of the present invention were prepared.

The catalyst was supported in one ceramic carrier. The thermal expansion coefficient C1 was measured and the experimental separation ratio H' at the temperature T was measured.

The catalyst was not supported on the other ceramic carrier. The fine pore amount D, the thermal expansion coefficient C2, and the surface porosity S of the other catalyst carrier were measured.

Next, the difference $\Delta$ CTE($\times 10^{-6}/°$ C.) of the thermal expansion coefficients C1 and C2 was calculated. The method of measuring those parameters C1, C2, H', and S is the same as those described in the first and second embodiments. The experimental separation ratio H' (namely, the measurement value H'), the temperature T, the fine pore amount D, the difference $\Delta$ CTE($\times 10^{-6}/°$ C.) of the thermal expansion coefficients, and the surface porosity S were obtained. Table 1 shows the experimental results.

Next, the formula defining the relationship between those parameters were calculated based on the values shown in Table 1 by Multi regression analysis, where the experimental separation ratio H' was a response variable (or a dependent variable), and other parameters were explanatory variables (or independent variables). Thereby, the formula (1) to calculate the calculated separation ratio H was obtained, where a rate of variance was 0.93 (R=0.93).

$$H = 217.254 + (-0.167) \times T + 0.345 \times D + 28.731 \times \Delta CTE - 3.343 \times S \quad (1),$$

where H is a calculated separation ratio, $\Delta$ CTE is a difference of thermal expansion coefficients, T is a temperature (K), D is a fine pore amount (cc/g) of not more than 2 μm, and S is a surface porosity (%).

The rate R of variance means a degree in difference between the experimental separation ratio H' and the calculated separation ratio H which is obtained by the relation formula (1) of the regression analysis. The more the rate R of variance approaches the value "1", the more the experimental separation ratio H' approaches the calculated separation ratio H, the difference or the error between the calculated separation ratio H and the experimental separation ratio H' is decreased.

TABLE 1

| Sample No. | Separation ratio (%) | Temperature (K) | Fine pore ratio Dp(%) | Difference $\Delta$CTE ($\times 10^{-6}/°$ C.) between thermal expansion coefficients | Surface porosity (%) |
|---|---|---|---|---|---|
| 1 | 28 | 1273 | 10 | 1.24 | 5 |
| 2 | 28 | 1273 | 30 | 1.00 | 5 |
| 3 | 28 | 1273 | 65 | 0.58 | 5 |
| 4 | 35 | 1273 | 10 | 1.48 | 5 |
| 5 | 35 | 1273 | 30 | 1.24 | 5 |
| 6 | 35 | 1273 | 65 | 0.82 | 5 |
| 7 | 28 | 1373 | 10 | 1.88 | 5 |
| 8 | 28 | 1373 | 30 | 1.64 | 5 |
| 9 | 28 | 1373 | 65 | 1.22 | 5 |
| 10 | 35 | 1373 | 10 | 2.08 | 5 |
| 11 | 35 | 1373 | 30 | 1.84 | 5 |
| 12 | 35 | 1373 | 65 | 1.42 | 5 |
| 13 | 28 | 1273 | 10 | 1.88 | 10 |
| 14 | 28 | 1273 | 30 | 1.64 | 10 |
| 15 | 28 | 1273 | 60 | 1.28 | 10 |
| 16 | 28 | 1373 | 10 | 2.38 | 10 |
| 17 | 28 | 1373 | 30 | 2.14 | 10 |
| 18 | 28 | 1373 | 60 | 1.78 | 10 |

Figure 10:
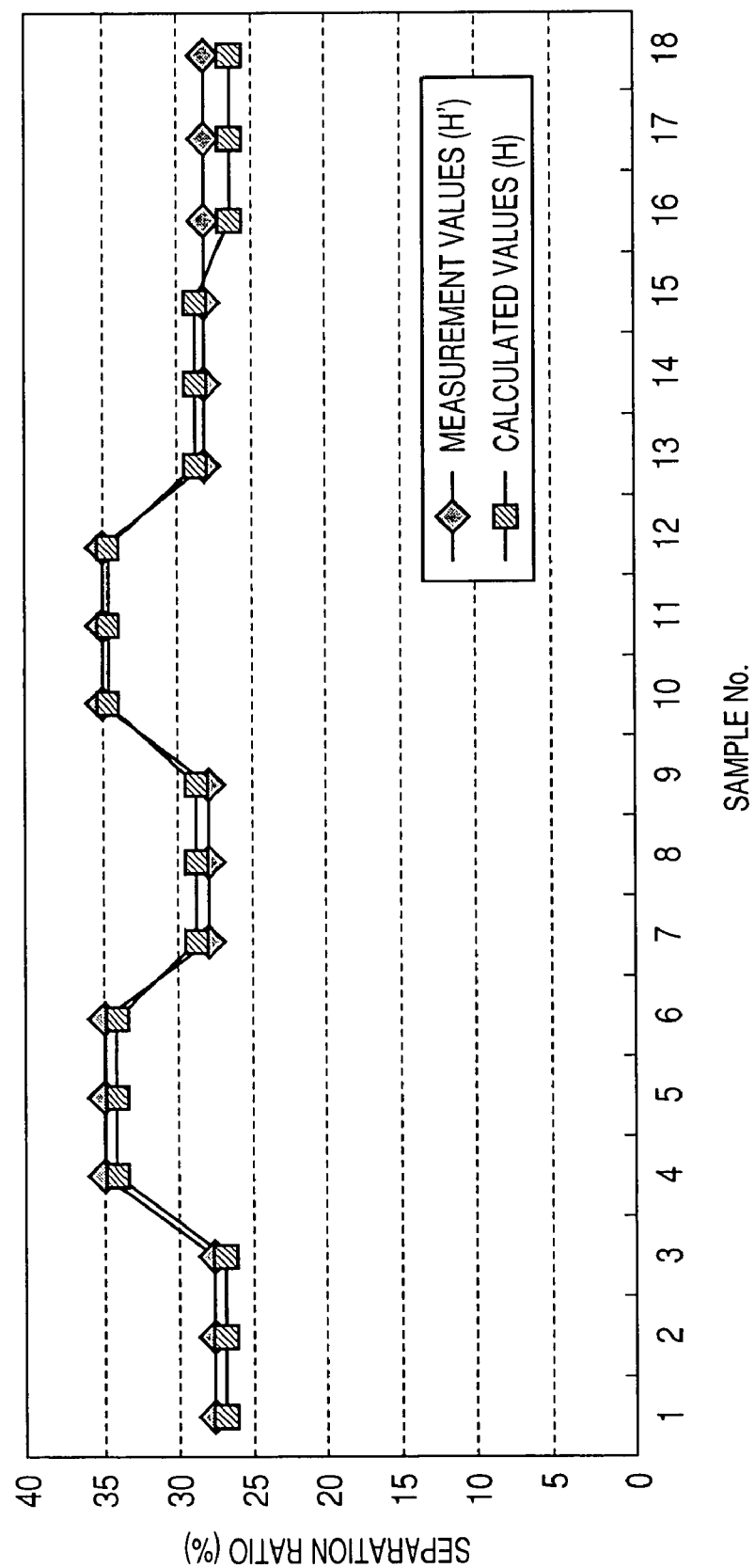
FIG. 10 is a diagram showing a relationship between measurement values and calculated values of the separation ratio of the ceramic catalyst body according to a third embodiment of the present invention.

FIG. 10 further shows the relationship between the experimental separation ratio H' (as the experimental value) shown in Table 1 and the calculated separation value H (as the calculation value) based on the experimental separation ratio H'. As clearly show in FIG. 10, it can be understood that the experimental separation ratio H' is almost equal to the calculation result. This can show the reliability of the formula (1).

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A ceramic catalyst body comprising a ceramic carrier made of cordierite which supports catalyst, the ceramic carrier comprising a plurality of cells surrounded by a plurality of cell walls arranged in a honeycomb shape, wherein the ceramic catalyst body has its separation ratio H of catalyst expressed by the following formula (1), $$H = 217.254 + (-0.167) \times T + 0.345 \times D + 28.731 \times \Delta CTE - 3.343 \times S \quad (1),$$

where $\Delta$ CTE ($\times 10^{-6}/°$ C.) is a difference=C1–C2 between a thermal expansion coefficient C1 of the ceramic catalyst body and a thermal expansion coefficient C2 of the ceramic carrier, T(K) is an internal temperature of the ceramic carrier, D(cc/g) is a amount of fine pores of not more than 2 μm in the ceramic carrier, and S(%) is a surface porosity indicating the ratio of an area of opening parts of the fine pores formed on a surface of the ceramic carrier to the surface area of the ceramic carrier, wherein the ceramic catalyst body has an entered amount of the catalyst of not more than 25%, where the entered amount of the catalyst indicates a ratio of an area of a catalyst part, where the catalyst has entered into the inside of the ceramic carrier in a particular area on a cross section of the ceramic carrier, to said particular area, and the separation ratio H is not more than 35%.

2. The ceramic catalyst body according to claim 1, wherein the thermal expansion coefficient C1 of the ceramic catalyst body is not more than $3 \times 10^{-6}/°$ C.

3. The ceramic catalyst body according to claim 1, wherein the thermal expansion coefficient C2 of the ceramic carrier is not more than $1 \times 10^{-6}/°$ C.

4. The ceramic catalyst body according to claim 2, wherein the thermal expansion coefficient C2 of the ceramic carrier is not more than $1 \times 10^{-6}/°$ C.

5. The ceramic catalyst body according to claim 1, wherein the difference $\Delta$ CTE between the thermal expansion coefficient C1 of the ceramic catalyst body and the thermal expansion coefficient C2 of the ceramic carrier is not more than $2 \times 10^{-6}/°$ C.

6. The ceramic catalyst body according to claim 2, wherein the difference $\Delta$ CTE between the thermal expansion coefficient C1 of the ceramic catalyst body and the thermal expansion coefficient C2 of the ceramic carrier is not more than $2 \times 10^{-6}/°$ C.

7. The ceramic catalyst body according to claim 3, wherein the difference $\Delta$ CTE between the thermal expansion coefficient C1 of the ceramic catalyst body and the thermal expansion coefficient C2 of the ceramic carrier is not more than $2 \times 10^{-6}/°$ C.

8. The ceramic catalyst body according to claim 1, wherein the surface porosity S of the ceramic carrier is within a range of 3 to 30%.

9. The ceramic catalyst body according to claim 2, wherein the surface porosity S of the ceramic carrier is within a range of 3 to 30%.

10. The ceramic catalyst body according to claim 3, wherein the surface porosity S of the ceramic carrier is within a range of 3 to 30%.

11. The ceramic catalyst body according to claim 4, wherein the surface porosity S of the ceramic carrier is within a range of 3 to 30%.

12. The ceramic catalyst body according to claim 1, wherein the ceramic catalyst body has an entered amount of the catalyst of not more than 15% which indicates a ratio of an area of the catalyst entered in the ceramic carrier against an optional area on a cross section of the ceramic carrier.

13. The ceramic catalyst body according to claim 2, wherein the ceramic catalyst body has an entered amount of the catalyst of not more than 15% which indicates a ratio of an area of the catalyst entered in the ceramic carrier against an optional area on a cross section of the ceramic carrier.

14. The ceramic catalyst body according to claim 3, wherein the ceramic catalyst body has an entered amount of the catalyst of not more than 15% which indicates a ratio of an area of the catalyst entered in the ceramic carrier against an optional area on a cross section of the ceramic carrier.

15. The ceramic catalyst body according to claim 1, wherein the catalyst is one or more selected from Pt, Rh and Pd.

* * * * *